United States Patent Office 3,071,054
Patented Jan. 1, 1963

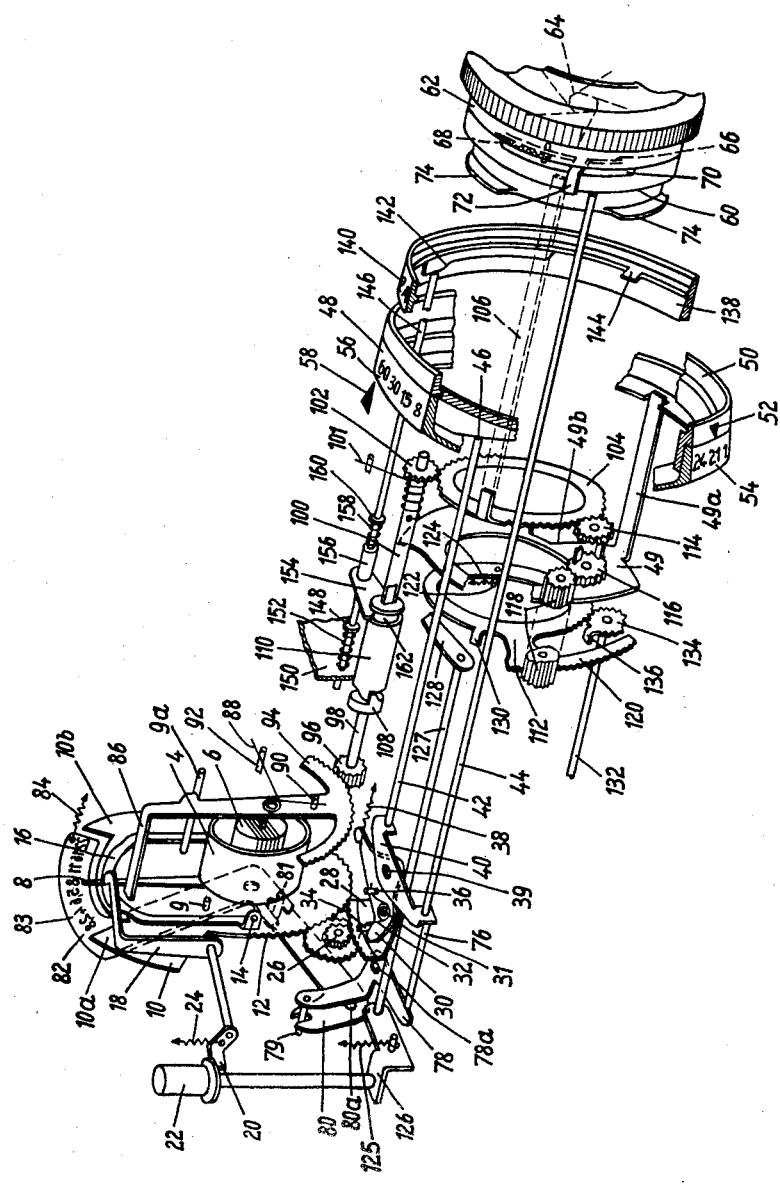

3,071,054
PHOTOGRAPHIC CAMERA
Franz Singer, Munich, Germany, assignor to Compur-Werk G.m.b.H. & Co., Munich, Germany, a firm of Germany
Filed Mar. 7, 1961, Ser. No. 94,038
Claims priority, application Germany Mar. 10, 1960
8 Claims. (Cl. 95—10)

This invention relates to a photographic camera, and more particularly to means for setting the exposure value of the camera in accordance with the prevailing illumination conditions.

An object of the invention is the provision of a generally improved and more satisfactory camera of the type having a built-in light meter or exposure meter automatically controlling at least one of the two principal variables (diaphragm aperture and shutter speed) which are to be adjusted or set when making an exposure.

Another object is the provision of a camera of the type having an interchangeable objective unit or lens unit, in addition to a built-in light meter or exposure meter, the mechanism being so designed that the light meter is affected or influenced by the interchangeable objective unit, in order to accommodate the light meter to different conditions resulting from interchanging differenet objective units.

A further object is the provision of an automatic camera (that is, a camera in which the built-in mechanism automatically sets at least one of the above mentioned two variables of diaphragm aperture and shutter speed) so designed that the range of possible adjustment is changed in accordance with the individual requirements of various different interchangeable objective units or lens units which may be selectively employed, so that the automatic operation of the camera is not limited to the use of any one objective, but the camera may retain its automatic setting function with each one of several different interchangeable objectives having respectively different ranges of diaphragm aperture adjustment.

These and other desirable objects may be attained in the manner disclosed as an illustrative embodiment of the invention in the following description and in the accompanying drawing forming a part hereof, in which the single FIGURE is an exploded perspective view, somewhat schematic, of mechanism according to a preferred embodiment of the present invention.

The invention of the present application constitutes an improvement upon the constructions disclosed in a series of prior U.S. patent applications relating to mechanisms of closely similar type, all beneficially owned by the beneficial owner of the present application, as follows:

Gebele, Serial No. 803,204, filed March 31, 1959, now Pat. No. 3,044,376.
Gebele, Serial No. 842,145, filed Sept. 24, 1959, now Pat. No. 3,044,377.
Gebele, Patent 2,969,004, granted Jan. 24, 1961, on an application filed Nov. 17, 1959.
Gebele and Singer, Serial No. 13,082, filed March 7, 1960.
Gebele and Singer, Serial No. 26,168, filed May 2, 1960.
Gebele, Serial No. 57,785, filed Sept. 22, 1960, now Pat. No. 3,013,478.
Gebele, Serial No. 79,313, filed Dec. 29, 1960.

The following description of the present invention presupposes that the reader is already familiar with the previous cases of the series, so that the present invention may be described more briefly, without explanation of features which will be obvious to those skilled in the art who are already familiar with this series of cases.

The constructions disclosed in the prior applications of this series are satisfactory for use in cameras with permanently mounted objective lenses. One of the applications of this series (Serial No. 57,785) discloses the automatic setting mechanism in connection with an interchangeable objective unit or lens unit. This arrangement is satisfactory when all of the interchangeable lens units have the same range of movement of the adjustable diaphragm which is ordinarily built into the objective or lens unit. But in those cases where different objectives have different aperture ranges, the prior construction just mentioned is not satisfactory except for the one particular range for which the automatic setting mechanism is designed. For example, one interchangeable lens may have a diaphragm range running from $f:2.8$ to $f:22$, and the automatic setting mechanism may operate this satisfactorily if it is designed for this range. But when this interchangeable lens is removed from the camera and is replaced by another interchangeable lens having a different diaphragm setting range or aperture range running, for example, from $f:5.6$ to $f:22$, then the prior automatic setting arrangement is not satisfactory because, under certain illumination conditions, it may attempt to set the diaphragm at an aperture of $f:2.8$ or an aperture between this value and $f:5.6$, whereas actually this cannot be done because the diaphragm of the interchangeable lens in question will not open to such a large aperture.

It is to this problem that the present invention is especially addressed. According to the present invention, the automatic setting mechanism built into the camera is influenced or controlled by the particular interchangeable lens unit which is attached to the camera at that time, in such a way that the automatic setting mechanism will set the diaphragm apertures accurately within the available range, and will indicate to the operator that an automatic setting cannot be made if the illumination conditions are such that the available range is not suitable. Hence the present invention, while constituting broadly an improvement upon all of the prior applications of the series above identified, may be regarded particularly or especially as an improvement upon the construction disclosed in application 57,785.

With regard to the general background of the present invention, it is now known in the art that automatic setting mechanisms of this same general type either may be so arranged as to set automatically only the diaphragm aperture, after the shutter speed has previously been selected and set by hand (for example, as in application 803,204, in FIG. 1 of application 842,145, and in FIGS. 1 and 3 of application 57,785) or may be so arranged as to set automatically both the diaphragm aperture and the shutter speed (as for example in Patent 2,969,004 and in FIG. 4 of application 57,785). It is immaterial for purposes of the present invention whether the automatic setting mechanism serves to set just the diaphragm aperture factor, or to set also the shutter speed factor, and as this will be well understood by those skilled in the art, the present disclosure has been simplified to illustrate setting of only the diaphragm aperture factor.

Referring now to the drawing, the camera includes a conventional body (not shown except for an interior fragment seen at 150) containing a light meter or exposure meter including the usual permanent magnet 4 and the usual moving galvanometer coil element 6 carrying a pointer or hand 8 which sweeps across the diapgram aperture scale 83 which is preferably marked on a transparent scale member or plate 82 visible through a window in a wall of the camera. The light meter is secured to a base plate 10 which is mounted for limited rotation on the camera body about a rotary axis coinciding with the pivotal axis of the coil 6 and pointer 8. This base plate 10 has gear teeth 12 on a portion of its periphery. The limits of motion of the pointer 8 with respect to the plate 10 are determined by stop pins 9 and 9a secured to the plate. The moving coil 6 of the meter is, in known manner, biased in one direction by a light spring and powered by electric current from the usual photocell which, because conventional, is not shown here but is shown, e.g., at 18 in Fahlenberg Patent 2,943,545, granted July 5, 1960.

Projecting portions or wings 10a and 10b on the meter base plate 10 form a mask for indicating, with respect to the scale 83, the aperture limits which are within that capability of automatic setting at any given position of rotational adjustment of the plate 10.

Pivot pins 14 on the base plate 10 serve to mount a pointer clamping member in the form of a loop or stirrup 16 (corresponding for example to the clamping member 64 in Patent 2,969,004) which is pressed toward the pointer 8 by an arm 18 when another arm 20 connected to the arm 18 is pressed downwardly against the force of the spring 24 by manual finger pressure on the release plunger or trigger 22 of the camera.

The above mentioned gear teeth 12 on the exposure meter base plate or mounting plate 10 are engaged by the large diameter gear teeth on a stepped gear 26 mounted on a suitable fixed pivot in the camera body. The smaller diameter gear teeth of this same stepped gear 26 mesh with the teeth of a crown wheel quadrant 28 which, together with an accompanying lever 30, is mounted for rotation on a fixed pin at 31 in the camera body, extending perpendicular to the axis of rotation of the gear 26. A spring 32 is coiled around the pivot 31 and has one end engaging a stud 34 on the crown gear 28 and its other end engaging a stud 36 on the lever 30, to tend to urge one arm of the lever 30 into contact with the stud 34. This spring 32 limits the torque which can be transmitted from the lever 30 to the quadrant 28 in a counterclockwise direction, to avoid damage to the parts under certain operating conditions, but the quadrant 28 will always tend to follow along with the lever 30 when the latter is turned in a counterclockwise direction, so that these parts constitute a resilient operating connection.

The free end of the lever 30 is biased in a clockwise direction by a spring 38 which is secured to a fixed point in the camera body. Pivotally mounted on the lever 30 at the pivot point 39 is a rocker or double-armed lever 40 with ears or flanges at its two opposite ends for respectively engaging two push rods 42 and 44 suitably guided inside the camera body for limited longitudinal movement therein. The rocker 40 together with the lever 32 and the quadrant 28 may be collectively referred to as a summation or integration mechanism or linkage.

The rear end of the push rod 42 engages one arm of the rocker lever 40, as shown, and the front end thereof engages a cam 46 operatively connected to the conventional shutter speed setting ring 48, which speed setting ring may in general correspond, for example, to the speed setting ring 12 in the above mentioned application 57,785. The cam 46 may be secured directly to the speed setting member 48 or preferably, as shown, it may be formed on a separate ring 50 which is releasably coupled frictionally or otherwise to turn with the ring 48 but is rotationally adjustable with respect thereto in order to set the mechanism to different film speeds or film sensitivities as indicated by the relationship of the index mark 52 on the ring 50 to the film speed scale or sensitivity scale 54 on the ring 48. This construction is similar to that shown in application 57,785 where the film speed setting ring is indicated at 20 and the film speed scale is shown at 7.

With this arrangement, when the shutter speed setting ring 48 is turned to adjust the shutter speed, the cam 46 will cause longitudinal movement of the push rod 42, either pushing it rearwardly against the force of the spring 38, or allowing it to move forwardly by the force of this spring, depending upon the direction of rotation of the setting ring 48. Assuming for the moment that the other push rod 44 remains axially stationary, the longitudinal movement of the push rod 42 will cause the rocker lever 40 to tilt on the stationary rear end of the rod 44 as a fulcrum, thereby moving the pivot 39 of the rocker and thus bodily moving the lever 30, so that the spring 32 will cause the crown gear 28 to move, and the motion thereof will be transmitted through the gear 26 and teeth 12 to the mounting plate 10 of the exposure meter, turning the entire exposure meter assembly bodily in one direction or the other, in order to feed into this mechanism the factor of shutter speed and also the factor of film speed or sensitivity. The shutter speed for which the adjusting ring 48 is set at any particular moment may be seen by reading the shutter speed scale 56 marked on this ring, in conjunction with the fixed index mark or reference point 58 which is on a suitable stationary part.

Within the shutter there is the usual conventional shutter speed control ring or cam 49, having an arm 49a which extends forwardly parallel to the optical axis and which engages a notch in the speed setting ring 48, so that the members 49 and 48 turn together as a unit. The speed control ring 49 also has a cam portion 49b which serves the usual conventional function of controlling the position of the conventional retarding mechanism in the shutter, to set the shutter for exposures of different speeds or durations, just as is done in many well known types of objective shutters and like the speed control cam 61 of Deckel Patent 1,687,123, for example, or many other patents, such a construction being very well known in this art.

The rear end of the other push rod 44 bears against the lug or ear at the opposite end of the rocker lever 40, and its forward end bears against a circumferentially extending abutment portion or shoulder 60 on the interchangeable objective mount or unit indicated in general at 62. As customary in conventional interchangeable lens units, the unit contains an adjustable diaphragm 64 (usually of the iris type) the leaves of which are movable to change the aperture of the diaphragm. These diaphragm leaves are actuated to various positions by rotating the conventional diaphragm actuating ring 66 which is biased or urged by a spring 68 in a direction toward one end of its range, preferably to the end corresponding to minimum aperture of the diaphragm. An arm 72 on the diaphragm actuating ring 66 projects out through a circumferential slot 70 into a position engaged by a forwardly projecting arm 106 on the diaphragm operating ring 104 mounted on the camera, this arm 106 serving to limit the extent to which the spring 68 can turn the actuating ring 66. A second similar arm at another point on the periphery of the ring 66 engages a lug 144 on the diaphragm setting ring 140 of the camera. This second arm is not shown in the present drawing, since the details of this construction are known and are not important to the present invention, but the construction in this respect may be similar to that shown in FIG. 6 of the drawings of the above mentioned application 57,785. The interchangeable lens unit or lens mount 62 is mounted on the camera by means of the usual bayonet type lugs or flanges 74, which pass through the conventional bayonet recesses (not shown) at the front of the shutter portion of the camera and then, upon rotation through a small fraction of a revolution, will engage behind conventional bayonet connection lugs on the camera.

A third push rod 76, in approximate axial alinement with the push rod 44, is located in the camera body for longitudinal movement and transmits the deflection of one end of the rocker 40, occasioned by fitting a fresh objective mount 62 to the camera, to a lever system comprising a first lever 78 pivotally mounted on a stationary vertical pivot at the location 78a, and having a pin 79 which engages a slot in a second lever 80 pivoted on a horizontal pivot at the location 80a. This second lever 80 carries a pin 81 engaging in a slot in the lever 82 which is pivoted for rotation concentrically with the pivotal axis of the exposure meter coil 6 and pointer 8. On an arcuate extension of the lever 82 the diaphragm aperture scale 83 is marked, and the lever 82 is biased in one direction by a spring 84, secured to a fixed part of the camera. As already mentioned, the portion of the lever 82 which carries the diaphragm aperture scale is preferably transparent, and when this is the case, the pointer 8 can lie behind the scale plate 82, or in other words on the far side of the scale plate from the observer. The wings 10a, 10b can also lie behind the scale plate 82, in a place between it and the plane of movement of the pointer 8.

The axial location of the shoulder or abutment 60 on the interchangeable lens unit 62 will determine the axial position of the push rod 44 when the interchangeable lens unit is fitted to the camera, since the spring 38 will cause the rocker 40 to push forwardly simultaneously on the rear ends of both rods 42 and 44. The axial position of the rod 44 in turn will determine the axial position of the third push rod 76 which, through the linkage 78, 80, controls the position of the diaphragm aperture scale plate 82. In this way the position of the aperture scale can be varied in accordance with the requirements of the particular interchangeable objective which is fitted to the camera at any given time.

Upon turning the shutter speed adjusting ring 48, the movement of the cam 46 causes the push rod 42 to move axially, thereby swinging the rocker 40 and, through the linkage 30, 28, 26, swinging bodily the entire base plate 10 of the exposure meter, but without causing any movement of the rod 76 or the scale plate 82. Fitting a fresh objective mount 62 to the camera, having a shoulder 60 in a different axial position on the mount, will cause a new axial position of the other push rod 44, likewise swinging the rocker 40 and bodily turning the base plate 10 of the exposure meter, but this (unlike a change in the axial position of the rod 42) will also move the third push rod 76 and thereby move the diaphragm aperture scale 83 and scale plate 82. In this way, the rotary position of the entire exposure meter assembly is a summation or integration depending partly upon the shutter speed to which the ring 48 has been set, and partly upon the diaphragm aperture range characteristics of the diaphragm 64 and the interchangeable mount 62, as determined by the position of the shoulder 60 on this mount, but the position of the aperture scale plate 82 and its scale 83 depends only on the position of the shoulder 60 of the interchangeable lens mount and not on the position of the shutter speed setting ring 48. By properly choosing the transmission ratios of the various parts of the transmission linkages, the respective positions of the base plate 10 of the exposure meter and of the scale plate 82 thereof can be properly correlated with the available range of adjusting movement of the diaphragm aperture size of any particular interchangeable objective unit or lens unit which may be applied to the camera, even though the range of adjustment of this unit may be different from that of another lens unit which is to be applied at a different time to the same camera.

The mechanism for automatic adjustment of the diaphragm aperture in accordance with illumination determined by the exposure meter, will now be briefly described, although the construction and operation of this mechanism will probably be already understood at this point by one who is familiar with the above mentioned previous applications in this series, especially application 57,785.

The mechanism comprises a feeler lever 86 mounted for rotation concentric with the pivotal axis of the pointer 8, inside the camera body. The feeler 86 is urged in a counterclockwise direction by a light spring 88, one end of which engages a stud 90 on the feeler and the other end of which engages a pin 92 fixed in the camera body. During clockwise swinging of the feeler 86 against the force of its spring 88, the feeler comes in contact with the pointer 8, and if the pointer is clamped at this moment by the clamp 16, the pointer will act as a fixed stop or limit for the clockwise swinging of the feeler 86.

The feeler is releasably coupled to the actuating ring 66 of the diaphragm 64 in the interchangeable objective or lens unit 62. This coupling may take the form, for example, of a gear quadrant 94 on the feeler 86, meshing with a pinion 96 fixed to the rear part 98 of a divided shaft, which part is capable of being coupled to and uncoupled from the forward part 100 of the shaft. A spring 101 is coiled around the shaft part 100 and tends to rotate it in a counterclockwise direction. The shaft part 100 carries fixed to it a pinion 102 meshing with a diaphragm operating ring 104 rotatable about the optical axis. This ring 104 has the above mentioned forwardly extending arm 106 which engages the arm 72 of the diaphragm actuating ring 66 on the interchangeable mount, serving as a stop to determine the extent to which the spring 68 can turn the ring 66 in a diaphragm-reducing direction. When the rear part 98 of the shaft is coupled to the forward part 100, the force of the spring 101 tending to turn the shaft part 100 in a counterclockwise direction is transmitted to the rear part 98 of the shaft. As the force of this spring 101 is greater than the force of the spring 88 on the feeler 86, it overcomes the spring 88 and turns the feeler in a clockwise direction until the feeler engages and is stopped by the clamped pointer 8.

For releasably coupling the two shaft sections 98 and 100 to each other, there is a clutch comprising a dog member or toothed member 108 fixed to the rear shaft section 98, and a second toothed member 110 nonrotatably mounted on the shaft section 100 but axially movable thereon. In the position shown in the drawing, the tooth of the member 110 is engaged with the tooth of the member 108 so that the two shafts are coupled to rotate in unison. But if the clutch member 110 is moved axially forwardly, it will be disengaged from the clutch member 108.

As customary in a shutter mechanism of this general type, there is a control ring 112 which may also be called the tensioning ring or cocking ring and which, like various other rings above mentioned, is rotatable about the optical axis of the camera as a center. This ring 112 corresponds in function, although not necessarily in shape, to the tensioning ring or control ring 54 in application 57,785, or to the ring 80 in the mentioned Patent 2,969,004 of this current series of cases. A spring 124, fastened at one end to a fixed point in the shutter housing and at the other end to a pin 122 on the ring 112, constantly tends to turn the control ring in a counterclockwise direction. The ring 112 is moved to cocked or tensioned position against the force of the spring 124 by the tensioning or cocking shaft 132 which corresponds in function and operation to the tensioning shaft 30 in the just-mentioned Patent 2,969,004 and which, as stated in that patent, is operated by the film feeding or advancing mechanism of the camera, so as to tension the shutter mechanism automatically when the film is advanced, without requiring a separate tensioning operation. The connections for operating the tensioning shaft from the film winding mechanism are also mentioned in and illustrated at 61a and 61b in FIG. 1 of the drawings of the above mentioned application 57,785. But these connections are conventional and well understood in the art, so it is unnecessary to show them in the present application.

When the tensioning shaft 132 is turned in a tensioning or counterclockwise direction (by operation of the film winding mechanism as above mentioned) a pinion 134 on this shaft meshes with gear teeth on the control ring 112 to turn this ring clockwise to its tensioned or cocked position, and at the same time a projection 136 on the pinion 134 serves to cock or tension the master member of the shutter. The details of the master member are not important for purposes of the present invention, so the master member is not illustrated here, but it and the associated shutter blade operating mechanism may take the form mentioned in column 2 of said Patent 2,969,004. It is noted that the clockwise direction of tensioning movement of the ring 112 is the same as that of the ring 80 in the mentioned Patent 2,969,004, but is the reverse of the direction of tensioning movement of the control ring 54 in the mentioned application 57,785. Of course the direction of movement of this ring or of any other parts may be changed as desired, within the skill of the designer, merely taking care to insert conventional motion-reversing gears or linkages wherever required.

When the control ring 112 reaches its fully tensioned position, it is latched in such position by the latch member or locking pawl 128 engaging a lug or projection 130 on the ring. This latch member is fixed to a shaft 127, which shaft also has fixed to it an arm 126 which underlies the release plunger 22, so that downward finger pressure on the release plunger will swing the shaft 127 against the force of its spring 125, to release the latch 128 from the lug 130, thereby allowing the spring 124 to turn the control ring 112 in a counterclockwise or running-down direction. Toward the end of its running down movement, a suitable cam on the control ring 112 will release the separate latch of the tensioned master member in the conventional way as well understood by those skilled in the art and as disclosed, for example, in the prior patents mentioned in column 2 of said Patent 2,969,004.

The diaphragm operating ring 104 is operatively connected to the control ring 112 by a lost motion connection which allows a certain amount of independent movement of these two rings, but moves one from the other at the required time. This lost motion connection comprises a pinion 114 meshing with gear teeth on the periphery of the diaphragm operating ring 104, and a second pinion 116 mounted coaxially with the pinion 114. Each of these two pinions has a lug extending axially toward the other one of these two pinions, as seen in the drawing, so that there is lost motion through part of one revolution. When these two pinions have turned relative to each other through the permissible range of lost motion, the lug on one pinion will engage with the lug on the other, and thereafter the two will turn together. The pinion 116 meshes with one end of an elongated pinion 118, the other end of which meshes with a gear quadrant 120 formed on part of the control ring 112.

It will be apparent from the drawing that these gears are arranged in such a way that the ring 104 turns in the opposite direction from the ring 112. During the tensioning or cocking operation, when the control ring 112 turns clockwise toward its fully tensioned or cocked position, this causes counterclockwise rotation of the pinion 118 and clockwise rotation of the pinion 116 driven thereby. The lug on the pinion 116 picks up and carries along the lug on the pinion 114 which likewise turns clockwise, thereby turning the diaphragm operating ring 104 counterclockwise, so that by the time the control ring 112 reaches its fully tensioned position (where the latch 128 drops behind the lug 130) the diaphragm operating ring 104 has reached its limit position in a counterclockwise direction, and the arm 106 thereof has turned the diaphragm actuating ring 66 of the interchangeable objective to one end of its range of movement, preferably the end corresponding to full or maximum diaphragm aperture. This counterclockwise rotation of the ring 104 causes clockwise rotation of the pinion 102 and the shaft 100, 98 (assuming that the clutch 108, 110 is coupled at this time) and the clockwise rotation of the pinion 96 moves the feeler 86 in a counterclockwise direction to its limit of motion, thereby freeing the pointer 8 of the exposure meter 6 for free movement in accordance with the illumination conditions which it is measuring.

When the exposure is to be made (after the mechanism has been cocked or tensioned as above described) the operator depresses the finger plunger or trigger 22. The first part of the downward movement operates the clamping arrangement 16, 18, 20 to clamp the pointer 8 in whatever position it occupies at the moment. Approximately simultaneously, the downward movement of the plunger, acting on the parts 126, 127, releases the latch 128 from the projection 130 of the control ring 112, so that the control ring now starts to run down in a counterclockwise direction under the influence of its power spring 124. This running down movement, through the gearing 118, 116, 114, releases the pressure which has held the diaphragm operating ring 104 in its maximum-aperture position and so the ring 104 begins to run down in a clockwise direction under the influence of its spring 101.

This running down movement of the ring 104 in a clockwise direction causes corresponding clockwise movement of the feeler 86, until the latter comes into contact with the exposure meter pointer 8, which now serves as a fixed stop because it is firmly clamped in fixed position by the clamping member 16. The contact of the feeler 86 with the pointer 8 thus stops the clockwise rotation of the ring 104 at a point corresponding to the illumination conditions measured by the exposure meter. The diaphragm actuating ring 66 in the interchangeable objective 62 follows along with the arm 106 on the ring 104, under the influence of the spring 68, so that the aperture of the diaphragm 64 in the interchangeable objective is set to the aperture determined by the position of the pointer 8 of the exposure meter.

The stoppage of movement of the ring 104 by contact of the feeler 86 with the clamped pointer 8, does not stop the running down movement of the control ring 112, however, because this ring can continue to run down all the way to its fully relaxed or rest position on account of the lost motion connection between the pinions 114 and 116. Just before the completion of the running down movement of the control ring 112, the conventional cam thereon will release the latch of the conventional master member so that the master member may rotate and open and close the shutter blades to make the actual exposure in the conventional manner well understood by those skilled in the art and therefore not illustrated here, because the details of this part of the construction are not important for purposes of the present invention. Those desiring more information about this conventional construction may consult, for example, Gebele Patent 2,900,886, issued August 25, 1959, in which it will be seen that the control ring 44 has a cam 76 which, at the end of the running down movement of the control ring, releases the latch 66 of the master member 18 so that the master member can turn to open and close the shutter blades.

In the simplest form of pointer clamping mechanism, removal of the operator's finger pressure on the release plunger 22 will unclamp the pointer 8. It is already known in the art, however, that supplemental mechanism may be provided for keeping the pointer clamped even after the finger pressure is removed; see for example the above mentioned application 13,082, or FIG. 3 of the above mentioned application 57,785. It is immaterial to the present invention whether or not such supplemental clamping mechanism be employed. In either event, when the point 8 does become unclamped after completion of the actual exposure the force of the spring 101 may drive the feeler 86 and the ring 104 through the remainder of their respective running down motions until they reach their respective rest positions or fully run down positions, and the spring 68 can move the ring 66 to its limit position at minimum aperture.

This automatic diaphragm setting mechanism, operating as above described, can be deactivated or rendered ineffective, when desired, to permit adjustment of the diaphragm by hand independently of the indication given by the exposure meter, as for instance for the purpose of taking flashlight photographs. To this end, a ring 138, conveniently called the selector ring, is provided in front of the ring 50 and coaxial with it, likewise rotating about the optical axis of the camera. This ring 138 serves both as a selector ring for determining whether the camera shall operate on automatic or manual operation of the diaphragm setting function, and also as a diaphragm setting ring for determining the diaphragm aperture whenever it is to be set manually.

The periphery of this selector ring 138 carries a mark "A" and circumferentially adjacent thereto a diaphragm aperture scale 140, beginning with the scale value of the smallest diaphragm aperture (largest $f$ number) next to the mark "A" and extending thence circumferentially to the value of the maximum diaphragm aperture (smallest $f$ number). In the construction here disclosed by way of example, the minimum diaphragm aperture is $f:22$. The scale on the ring 138 (both the numerical part thereof and the mark "A") are read in conjunction with the same fixed reference point or index mark 58 which is used for reading the shutter speed scale 56 on the speed setting ring 48.

Formed on this selector ring 138 is a cam edge 142 and also a lug 144 which cooperates with the already mentioned conventional second arm (like the arm 72, but not shown) on the diaphragm actuating ring 66 of the interchangeable objective, in the same way and in the same direction of rotation as that in which the arm 106 cooperates with the first arm 72 of the diaphragm actuating ring 66. The cam 142 engages the forward end of a rod 146 which extends rearwardly from the cam, parallel to the optical axis. A spring 152 encircling the rod 146 presses rearwardly against a fixed part 150 of the camera and presses forwardly against a collar 148 fixed to the rod 146 to urge the rod forwardly to keep it constantly engaged with the cam 142.

A clutch shifting fork 154 is fixed to a sleeve 156 having a limited range of longitudinal sliding movement on the rod 146. A spring 158 encircling the rod presses forwardly on a collar 160 fixed to the rod 146 and presses rearwardly on the sleeve 156, tending to move this sleeve rearwardly against a fixed stop (not shown) on the rod 146. The shifting fork 154 engages a circumferential groove 162 in the clutch member 110.

The proportions of the parts are such that when the shift ring 138 is in the position with the indication "A" opposite the index mark 58, indicating "automatic" setting of the diaphragm aperture, the high point or rise of the cam 142 is opposite the front end of the rod 146 and presses this rod rearwardly against the force of its spring 152, thereby keeping the shifting fork 154 in its rearward position so that the axially movable clutch jaw 110 remains engaged with the axially fixed clutch jaw 108, and the two parts 100 and 98 of the shaft are clutched to each other and turn together as a unit, to enable the automatic setting of the diaphragm aperture in a manner already described above. However, if it is preferred to set the diaphragm aperture manually rather than automatically, then the selector ring or aperture setting ring 138 is turned counterclockwise from the "A" position to any other desired position with any selected numerical value of the scale 140 opposite the index mark 58. In all of these other positions except the "A" position, a lower portion of the cam 142 is opposite the front end of the rod 146, so that the rod 146 can move farther forward under the influence of the spring 152.

The forward motion of the rod 146 causes the clutch fork 154 to move the clutch member 110 forwardly out of contact with the other clutch member 108, thus disconnecting the two shaft sections 98 and 100 from each other. The spring 88 is then free to swing the feeler 86 in a counterclockwise direction and keep it at the counterclockwise limit of its motion, which corresponds to the tensioned or cocked position of the feeler under auto- matic operation conditions. Thus the feeler does not interfere with the movements of the pointer in the visible part of its range, and the indication of the exposure meter can still be read despite the disconnection of the automatic setting mechanism.

Then when the shutter mechanism is tensioned or cocked, and is released for a running-down motion, the running down of the ring 104 will not be stopped by contact of the feeler 86 with the pointer 8, because the ring 104 is no longer operatively connected to the feeler. On the contrary, the ring 104 will run down all the way to its fully run down or rest position, under the influence of the spring 101, and the arm 106 will not stop the running down motion of the ring 66 at an intermediate point, but will allow the ring (so far as this arm 106 is concerned) to run down all the way to minimum aperture position. But actually the running down motion of the ring 66 will be stopped by contact of the second arm on the ring with the lug or projection 144 on the selector ring 138 which has been manually set to the desired aperture position.

The selector ring 138 may be shifted back from manual position to automatic position at any time, independently of the operational position of the parts, i.e., independently of whether the mechanism is in tensioned (cocked) position or in run-down position. If the parts are in tensioned position at the time, the rotary orientation of the clutch member 110 will agree with that of the clutch member 108, so that the rearward movement of the rod 146 caused by rotation of the selector ring 138 to "A" position will immediately move the clutch member 110 into proper mesh or mating engagement with the clutch member 108. If the parts are in untensioned or rundown position at the time, the rotary orientation of the clutch member 110 will be different from that of the clutch member 108, so that when the rod 146 moves rearwardly the teeth of the two clutch members will not mesh and the member 110 cannot complete its rearward movement. But the spring 158 will compress and allow the member 110 to remain in its forward position until the next time that the mechanism is tensioned or cocked. The tensioning operation will turn the clutch member 110 to a position of orientation corresponding to that of the member 108, and when it reaches this position the force stored in the spring 158 will cause the member 110 to snap rearwardly into full meshing engagement with the member 108, to re-establish the automatic exposure value setting condition of the parts.

The operation, so far as concerns the interchangeable objectives, may be summarized as follows: When the interchangeable objective 62 is placed on the camera, the abutment surface 60 thereof, engaging the front end of the push rod 44, operates the summation linkage or integrating linkage 40, 30, 28, etc., to swing the entire base plate or mounting plate 10 of the exposure meter and with it the scale plate 82, to an appropriate position for the possible range of movement of the diaphragm which is built into the particular interchangeable unit being used. It will be understood in this connection that different interchangeable units 62 with different diaphragm aperture characteristics have their respective abutment shoulders 60 located in different axial positions on the respective interchangeable units, while those units having the same diaphragm aperture characteristics have their abutment shoulders 60 located at the same axial position. For example, if a first interchangeable objective 62 has a maximum diaphragm aperture of $f:2.8$ and a second interchangeable objective has a maximum diaphragm aperture of $f:5.6$, the abutment shoulder 60 on the second objective will be further to the rear (closer to the bayonet connection wings or flanges 74) than the shoulder on the first objective. Then when the second objective is fitted to the camera, its shoulder 60 will push the rod 44 farther rearwardly than was the case with the first objective, so that the entire meter mounting plate 10 and scale plate 82 will be swung farther in a counterclockwise direction than was the case with the first objective. Thus the smaller $f$ numbers such as 2.8 and 4, which are no longer available as settings when the second objective is used, will be swung leftwardly out of the view of the camera body observation window through which the scale 83 is observed and also out of or beyond the range of movement of the feeler 86. The tensioned or cocked position of the feeler 86 (which is always the same position relative to the camera body) will thus correspond to the largest available aperture whose $f$ number can be read on the scale plate 82 (e.g., an aperture of $f$:5.6).

In this way, the advantages of automatic diaphragm control can be secured even if the camera is fitted with exchangeable objectives of different maximum relative apertures, and the maximum aperture capabilities of all available objectives can be fully utilized. Furthermore, the aperture can still be adjusted by hand if desired, rather than automatically, and when the parts are set for manual adjustment the portion of the scale 83 visible through the observation window in the camera body will serve as an indication of the largest aperture (smallest $f$ number) which the operator should attempt to set by hand. Moreover, the position of the pointer 8 can still be read as an aid in setting the diaphragm by hand, even though the automatic setting mechanism is inactive.

The rest of the operation (other than the control of the exposure meter and the automatic setting mechanism by the interchangeable objective, which is a principal feature of the present invention) has been described in sufficient detail above. To mention some of the features again but very briefly, when the shutter speed setting ring 48 is turned to pre-select the desired shutter speed, this turns with it the ring 50 which has previously been set relative to the ring 48 to reflect the existing film speed or film sensitivity, and the turning movement of the cam 46 on the ring 50 operates the push rod 42 to feed into the summation linkage 40, 30, etc., the combined factor of shutter speed plus film speed, thereby turning the entire base plate 10 of the exposure meter, relative to the diaphragm aperture scale plate 82 which now remains stationary. Assuming, for instance, that the shutter speed setting ring 48 is turned in a counterclockwise direction from a position of slow shutter speed, e.g., 15, to a position for a higher or faster shutter speed, e.g., 60, this motion will cause rearward movement of the push rod 42, counterclockwise rotation of the lever 40 (the left end of which will fulcrum on the now-stationary rear end of the rod 44) thus pushing rearwardly on the pivot 39 of the lever 40 so as to move the lever 30 and the crown gear 28 in a counterclockwise direction, causing clockwise rotation of the gear 26 and counterclockwise rotation of the base plate 10 of the exposure meter, thereby turning the entire exposure meter so that (assuming that the illumination condition remains constant) the pointer 8 thereof will swing leftwardly with the base plate 10, relative to the now stationary scale 83 on the scale plate 82, thus indicating that for the faster shutter speed a larger diaphragm aperture is needed.

The mechanism can be tensioned or cocked, ready for an exposure, either before or after moving the speed selecting ring 48 to select the desired shutter speed, and either before or after fitting the desired interchangeable objective unit 62 to the camera. In either case, the tensioning or cocking operation (performed through rotation of the shaft 132 operatively connected to the film winding or feeding mechanism) serves to turn the control ring 112 in a clockwise direction, thereby swinging the feeler 86 counterclockwise to its limit of motion, and likewise turning the ring 104 counterclockwise to its limit of motion, so that the arm 106 thereof opens the diaphragm actuating ring 66 to its maximum aperture position. This tensioning movement is performed against the force of the springs 68, 101, and 124. Upon subsequent downward pressure on the release plunger 22, the parts perform their running down motion under the influence of the springs 68, 101, and 124, automatically setting the diaphragm aperture and making the exposure, as already described above.

The design of the interchangeable objective units 62 is such that in all of the units, the position of orientation of the arm 72 is the same when the respective diaphragms of the respective units are at maximum aperture, even though the numerical values of the respective maximum apertures may be different. Thus when the arm 106 comes to its fully tensioned position, it will always bring the diaphragm of the attached objective unit to its maximum aperture position, regardless of the fact that in one objective unit this maximum aperture may have one value and in another unit it may have a different value. Of course it is desirable also that the respective diaphragms of all of the different units be so designed that the same angular movement of the ring 66 in all units will produce the same proportionate effect on the diaphragm aperture, even though the maximum apertures of the different units may be different.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera comprising a meter mounting member mounted for rotary movement about an axis, an exposure meter mounted on said member and movable bodily therewith, said meter including a pointer swingable about substantially the same axis, a pointer scale plate also swingable about substantially the same axis, an adjustable shutter speed setting member, an interchangeable objective unit, means operated by fitting the objective unit to the camera for swinging both said mounting member and said scale plate together, and means operated by said shutter speed setting member for swinging said meter mounting member independently of said scale plate.

2. A photographic camera comprising a meter mounting member mounted for rotary movement about an axis, an exposure meter mounted on said member and movable bodily therewith, said meter including a pointer swingable about substantially the same axis, a pointer scale plate also swingable about substantially the same axis, an adjustable shutter speed setting member, an interchangeable objective unit, and summation linkage means operatively connecting said meter mounting member, said scale plate, said speed setting member, and said objective unit to swing both said meter mounting member and said scale plate concomitantly by the act of fitting the interchangeable objective unit to the camera and to swing said meter mounting member without said scale plate by the act of adjusting said speed setting member.

3. Automatic diaphragm aperture control means for a photographic camera of the type comprising an adjustable shutter speed setting member having a cam movable thereby, a built-in exposure meter mounted for bodily rotation and having a movable pointer, means for clamping said pointer to form a stop, a feeler member for engaging said pointer when clamped, an interchangeable objective mount having a spring loaded diaphragm actuating member therein and also having an abutment, and means controlled by the position of said feeler member when stopped by engagement with the clamped pointer for determining an operating position of said diaphragm actuating member, characterized by transmission means including a summation linkage for operatively connecting said exposure meter on the one hand to said cam on said shutter speed setting member, and on the other hand to said abutment on said objective mount, so that the angular position of said exposure meter in relation to a camera body member is determined both by the preselected position of said speed setting member and by the position of said abutment on said objective mount.

4. A construction as defined in claim 3, in which said summation linkage comprises a lever pivoted on a fixed fulcrum and having one arm loaded by spring means and another arm operatively connected to said exposure meter to rotate said meter bodily, a rocker pivotally mounted on said lever, a push rod operatively connecting one arm of said rocker to said cam on said shutter speed setting member, and a second push rod operatively connecting a second arm of said rocker to said abutment on said objective mount.

5. A construction as defined in claim 4, further including a scale plate mounted for rotation concentrically with said pointer, a diaphragm aperture scale on said scale plate for cooperation with said pointer, and means including a lever system operatively coupling said scale plate to said second arm of said rocker, the parts being so proportioned that any rotary deflection of said exposure meter due to a change in position of said abutment is accompanied by rotary deflection of said scale plate in the same direction and to the same angular extent.

6. A construction as defined in claim 4, in which said summation linkage comprises two components held in mutual contact by spring means to limit the maximum torque transmissible by said lever in one direction of rotation.

7. A photographic camera comprising a meter mounting member mounted for rotary movement about an axis, an exposure meter mounted on said member and movable bodily therewith, an adjustable shutter speed setting member, an interchangeable objective unit, a diaphragm mounted in said unit, means controlled by said exposure meter for determining an operating position of said diaphragm, first means operated by fitting the objective unit to the camera for swinging said mounting member, and second means movable with said shutter speed setting member for swinging said meter mounting member independently of said first means.

8. A photographic camera comprising a meter mounting member mounted for rotary movement about an axis, an exposure meter mounted on said member and movable bodily therewith, an adjustable shutter speed setting member, an interchangeable objective unit, a diaphragm mounted in said unit, said meter including a pointer swingable about substantially the same axis, and means controlled by said pointer for determining an operating position of said diaphragm, and summation linkage means operatively connecting said meter mounting member, said speed setting member, and said objective unit to swing said meter mounting member by the act of fitting the interchangeable objective unit to the camera and by the act of adjusting said speed setting member.

References Cited in the file of this patent

UNITED STATES PATENTS

| | | |
|---|---|---|
| 2,596,328 | Dorsey | May 13, 1952 |
| 2,935,920 | Rentschler | May 10, 1960 |
| 2,949,069 | Gebele | Aug. 16, 1960 |